Patented Nov. 20, 1945

2,389,418

UNITED STATES PATENT OFFICE 2,389,418

PLYWOOD STRUCTURES AND RELATED ARTICLES AND METHOD OF MAKING THE SAME

Gaetano F. D'Alelio, Pittsfield, Mass., assignor to General Electric Company, a corporation of New York No Drawing. Application October 15, 1942, Serial No. 462,206

17 Claims. (Cl. 20—89)

This invention relates to plywood structures and related bonded wood articles bonded with an improved adhesive of particular utility for bonding (laminating) wood surfaces and to a method of making such articles. The invention will be particularly described in connection with plywood structures.

In my United States Patent 2,260,006, issued October 21, 1941, I have disclosed and claimed a resinous product of reaction of ingredients comprising a phenol, an aliphatic aldehyde and a derivative of a polycarboxylic acid containing at least three carbon atoms, said derivative containing at least one —COOH radical and at least one amidated carboxylic radical having at least one hydrogen atom attached directly to the amide nitrogen.

I have now discovered that if an aldehyde-reactable mono-hydroxy aryl sulfonic acid is incorporated into the resinuous compositions disclosed in my U. S. Patent 2,260,006, especially those obtained by the reaction of a phenol and formaldehyde in the ratio of 1 mol of the former to 1.5 to 2.5 mols of the latter, products are obtained that have particular utility in the preparation of plywood structures. These new resins are especially applicable to the manufacture of plywood structures demanding the use of adhesives of the cold-set or quick hot-set type.

It is therefore an object of my invention to provide improved bonded wood structures.

Another object of the invention is to provide an improved low-temperature phenolic resin adhesive for bonding wood structures such as plywood.

A further object of the invention is to provide a plywood structure having very good shear strength along the adhesive line.

As indicated above, these and additional objects which will become apparent from the following description of my invention are attained by employing, as the wood adhesive, a liquid alkaline-catalyzed phenol-aldehyde resin modified with a semi-amide of a polycarboxylic acid and containing an aldehyde-reactable mono-hydroxy aryl sulfonic acid, particularly phenol sulfonic acid, as a hardening accelerator for the resin. I have found that bonded wood structures joined by means of such adhesives exhibit outstanding strength and weather- and water-resistance. The bench-life of the adhesive after incorporation of the phenol sulfonic acid is sufficiently long for commercial use thereof, with the actual bench-life of any particular formulation depending on the amount and kind of sulfonic acid contained therein.

To prepare the adhesive of this invention, a phenol is reacted with an aldehyde, preferably formaldehyde or compounds capable of engendering formaldehyde, in the ratio of 1 mol of the phenol to 1.5–2.5 mols aldehyde under alkaline conditions and, preferably, at reflux temperature of the reaction mass. The reaction is allowed to proceed until a liquid product is obtained which, after neutralization and dehydration, will have a viscosity or consistency sufficiently low that the adhesive may be readily applied to the wood surface but not so low that the resin will flow excessively from between the wood plies when pressure is applied. The total time necessary to reach this stage depends, of course, on the type and amount of alkaline catalyst used, the temperature of the reaction mass, the mol ratio of the phenol to formaldehyde used in preparing the resin, and the specific application for which the adhesive is to be used. When the desired point is reached, a sufficient amount of a semi-amide of a polycarboxylic acid is added to obtain a pH of about 4.5–5.5. This end point may be just after the reflux period or after the mass has been partially dehydrated. The resulting mass is then further dehydrated, preferably at reduced pressure, to a viscosity of approximately 12,000 to 100,000 cp. (centipoises), or even higher, depending on the particular application of the adhesive. A viscosity of 12,000 is obtained by dehydrating the resin until the temperature of the resin is approximately 70° C. under a vacuum of 25 inches. A viscosity at 25° C. of about 26,000 cp. is obtained by dehydrating the resin until the temperature is approximately 77° C. under a vacuum of 25 inches. Higher viscosities may be obtained by dehydrating to correspondingly higher temperatures. In no case it is desirable to carry the dehydration to the point where the resin temperature exceeds 100° C. at 25 inches vacuum. When the resin is dehydrated to a resin temperature of approximately 97° C. at 25 inches vacuum, a viscosity at 25° C. of approximately 100,000 cp. is obtained. For general purpose adhesives, the resins having a viscosity at 25° C. of 12,000 to 26,000 cp. are most suitable. However, for uniting highly compressed, impregnated veneer structures to each other, without the use of especially prepared face sheets, the resins having a viscosity at 25° C. of approximately 100,000 cp. are preferred. The dehydrated products may be stored for long periods of time without substantial change.

The aldehyde-reactable mono-hydroxy aryl sulfonic acid is added to the resin just prior to its application as an adhesive. The acid is preferably added in the form of an aqueous solution and in amounts corresponding approximately to from 1.75 to 4.75 per cent by weight, based on the weight of the resin. The amount of the particular mono-hydroxy aryl sulfonic acid added is dependent on the equivalent weight of the acid. For example, the preferred approximate percentage ranges for a few of the common mono-hydroxy aryl sulfonic acids all of which contain a phenolic hydroxy radical are: phenol sulfonic acid (equivalent weight 174) 2 to 3.6%, cresol sulfonic acids (equivalent weight 186) 2.1 to 3.8%, naphthol sulfonic acids (equivalent weight 224) 2.6 to 4.7% and naphthol disulfonic acids (equivalent weight 152) 1.75 to 3.1%. The amount of the phenol sulfonic acid used determines the properties of the resulting adhesive. For example, when employing a 30 per cent aqueous solution of phenol sulfonic acid, the incorporation of about 7 per cent by weight of the solution into the above-mentioned resin produces an adhesive which is most useful as a hot-set adhesive. The addition of from 9 to 12 per cent of the solution produces a cold-set adhesive. For most cold-set applications I prefer to use about 9 per cent of the 30 per cent solution (corresponding to about 2.7 per cent by weight of phenol sulfonic acid based on the weight of the resin).

The resulting resin is applied to the wood surface to be joined, for example the surfaces of plywood veneers, allowed to air-dry for a few minutes, and the adhesive-coated pieces assembled and pressed at about 100 lbs. per sq. in. About 8 grams adhesive per sq. ft. of veneer surface has been found to be most satisfactory. When the adhesive is of the cold-set type, pressure is applied for from 10 to 20 hours. When heat is used to accelerate the cure of the hot-set adhesives the time will depend on the thickness of the plywood structure. Ordinarily about 1 hour per inch at 30 lbs. steam pressure is sufficient. If desired, the joined bodies may be subjected to further heat treatment after removal from the press at temperatures which will not injure the wood.

The following examples illustrate preferred embodiments of my invention. It is to be understood, however, that the invention is not limited to the specific proportions and procedures set forth therein.

*Example 1*

A mixture of 11.28 kilograms (120 mols) synthetic phenol, 24.0 kilograms aqueous formaldehyde solution containing approximately 37.2 per cent CH$_2$O (300 mols) and 84.8 grams (approximately 1.5 mols) potassium hydroxide in 120 c. c. water was heated under reflux conditions for 1½ hours. The products of reaction were then cooled and 243.2 grams (approximately 1.5 mols) monophthalamide was added with the result that the pH of the mass was lowered to 4.5. The product was dehydrated by heating under 25 inches of vacuum to a point where the internal resin temperature was 70° C. Three portions of the resin were respectively mixed with 7, 9 and 12 per cent of a 30 per cent aqueous solution of phenol sulfonic acid and subjected to various tests to determine the suitability of the resultant adhesives as a binder for wood. The bench-life of the products was comparable with the bench-life of various commercial plywood adhesives. The adhesive containing 7 per cent of the aqueous sulfonic acid solution cured at elevated temperatures, while the adhesives containing large amounts of the hardening accelerator cured at room temperatures, as well as at elevated temperatures. The following table sets forth the shear strength of the adhesive containing 7 per cent phenol sulfonic acid solution (adhesive A) as a plywood bond for poplar veneer and, as a basis of comparison, the shear strengths of two different commercial synthetic resin plywood adhesives (adhesives B and C) and an ordinary hot-set alkaline-catalyzed phenol-formaldehyde resin (adhesive D).

| Adhesive | Grams adhesive per sq. ft. | Comparative shear strength |
| --- | --- | --- |
| A | 4 | 640 |
|   | 8 | 860 |
|   | 12 | [1] 820 |
| B | 4 | 370 |
|   | 8 | 490 |
|   | 12 | 550 |
| C | 4 | 510 |
|   | 8 | 460 |
|   | 12 | [1] 625 |
| D | 4 | 560 |
|   | 8 | 560 |
|   | 12 | 440 |

[1] Wood failed.

The plywood samples bonded with resins A, C, and D were hot-pressed 1 hour per inch thickness at 30 lbs. steam pressure, while samples B were cold-pressed for 15 hours. After pressing, all samples were heat-treated for 3 hours at 60°. In similar tests on the cold-set adhesive containing 9 per cent of a 30 per cent aqueous solution of phenol sulfonic acid, the shear strength of the resin could not be accurately determined due to the fact that the wood failed in each instance before the resin bond could be broken. Samples of plywood bonded by means of any of my adhesives showed no tendency to delaminate during immersion in boiling water for 8 hours.

As far as I am aware, it has been impossible heretofore to bond highly compressed, impregnated veneer structures to each other with a cold-set adhesive. The following example illustrates how my novel cold-set adhesives may be used to bond a plurality of such veneer structures together.

*Example 2*

The highly compressed, impregnated veneer structures were made as follows: Thin birch veneer wood was soaked in a water-soluble phenolic varnish for 24 hours, stacked, and the resin allowed to diffuse into the wood for 24 hours. After drying 2 hours at 90° C., the veneer sheets were assembled at a grain angle of 17° from the longitudinal axis so that the angle between the grains of successive plies was 34°. Prior to pressing, the face sheets were given an additional drying until the volatile content was 2 to 3%. The veneer structure was pressed at 1500 lbs. per sq. in. pressure, slowly bringing the temperature up to 150° C., holding at this temperature for 15 minutes, and then slowly cooling to room temperature. The above-described procedure gives a highly compressed wood veneer structure having semi-porous faces.

Ten panels of the above-described veneer structure were sanded and roller-coated with the liquid resin of Example 1 containing 9 per cent by weight of 30 per cent phenol sulfonic acid solution based on the weight of the resin. After air-drying 15–30 minutes, the panels were assembled with their longitudinal axes parallel. The whole structure was then subjected to a pressure of 100–200 lbs. per sq. in. pressure at room temperature for 15–24 hours, followed by heating under the same pressure for 2–3 hours at 60° C. Numerous structures made according to the above procedure consistently broke in the wood and not in the adhesive when subjected to shearing tests parallel with the adhesive line.

*Example 3*

A portion of the resin of Example 1, taken prior to addition of phenol sulfonic acid, was further dehydrated to an internal resin temperature of 97° C. at 25 inches vacuum yielding a resin of approximately 100,000 cp. viscosity at 25° C. While still hot, 2 per cent alcohol was added to give a composition which was spreadable when cold. Eight per cent by weight of 30 per cent aqueous solution of phenol sulfonic acid based on the weight of the alcoholic resin was added to this composition and the product was spread upon sanded highly compressed, impregnated veneer panels similar to those described in Example 2, but having no special face sheets. After air-drying the coatings for 15 hours, two such panels were bonded together by pressing at 100–200 lbs. per sq. in. at 110° C. for 15 minutes. When subjected to a shearing force parallel with the adhesive line, the wood, but not the adhesive, failed.

By the term "a phenol" as used herein, I mean those phenols which are well known to the resin art to be aldehyde-reactable and capable of yielding useful resinous products, e. g., phenol, cresols, etc. Additional examples of phenols that may be used are given in my above-identified patent. Preferably, I use phenol or mixtures of phenol with minor quantities of its hydrocarbon homologues, e. g., mixtures of phenol and cresols, mixtures of phenol, cresols and xylenols, etc. I have found that resins made from straight phenol are usually more easily spreadable when used as plywood adhesives than are the resins made from the other phenolic bodies.

By the term "semi-amide of a polycarboxylic acid" as used herein, I mean those derivatives of a polycarboxylic acid having at least one —COOH group and at least one amide group having at least one hydrogen atom attached to the amide nitrogen, e. g., phthalic acid monoamide (phthalamic acid), oxalic acid monoamide, malonic acid monoamide, citric acid monoamide, citric acid diamide, etc. Additional examples of such semi-amides of polycarboxylic acids are given in my above-identified patent.

The term "aldehyde-reactable mono-hydroxy aryl sulfonic acid" as used herein is intended to cover those sulfonic acids which are unsubstituted in at least one of the positions ortho or para to the phenolic hydroxyl group. Specific examples of such sulfonic acids are: phenol sulfonic acid, phenol disulfonic acid, the ortho-, meta-, and para-cresol sulfonic acids, the 3,5-xylenol sulfonic acids, the 3,4-xylenol sulfonic acids, the 2,3-xylenol sulfonic acids, the ethyl-phenol sulfonic acids, the propyl-phenol sulfonic acids, the butyl-phenol sulfonic acids, the naphthol sulfonic acids, the naphthol disulfonic acids, etc.

In general, about 8 grams adhesive per sq. ft. of veneer should be used for best results with either the hot- or cold-set adhesives. For ordinary veneer work, the cold-set adhesives, particularly those containing about 2.4 to 3.5 per cent of the aldehyde-reactable mono-hydroxy aryl sulfonic acid, are preferred.

Although the invention has been particularly described in connection with plywood, it is to be understood that it is not limited thereto as my adhesive materials may be used in joining other wood articles. For example, they may be used as joint adhesives for wooden furniture and the like. They are especially suited for joining compressed plywood structures to each other. Plywood prepared in accordance with my invention may be used in the manufacture of small watercraft, aircraft, panelling, furniture, or any of the other numerous manufactures for which such materials are or have been used.

What I claim as new and desire to secure by Letters Patent of the United States is:

1. A plywood body, the individual plies of which are joined together by means of an adhesive comprising (1) the resinous reaction product of an alkaline-catalyzed liquid phenol-aldehyde condensation product and a derivative of a polycarboxylic acid containing at least three carbon atoms, said derivative containing at least one —COOH radical and at least one amidated carboxylic radical having at least one hydrogen atom attached directly to an amide nitrogen and (2) from 1.75 to 4.75 per cent by weight based on the weight of (1) of an aldehyde-reactable mono-hydroxy aryl sulfonic acid containing a phenolic hydroxy radical.

2. An article of manufacture comprising a plurality of wood surfaces bonded together by means of an adhesive comprising (1) a resinous reaction product of a liquid, alkaline-catalyzed condensation product of a phenol and formaldehyde and a derivative of a polycarboxylic acid containing at least three carbon atoms, said derivative containing at least one —COOH radical and at least one amidated carboxylic radical having at least one hydrogen atom attached directly to an amide nitrogen, said resinous product having a pH of from 4.5 to 5.5, and (2) an aldehyde-reactable mono-hydroxy aryl sulfonic acid in an amount corresponding to from 1.75 to 4.75 per cent by weight of (1), said mono-hydroxy aryl sulfonic acid containing a phenolic hydroxy radical.

3. A plywood body, the individual plies of which are joined together by means of an adhesive comprising (1) the resinous reaction product of (a) a liquid alkaline-catalyzed phenol-formaldehyde condensation product and (b) phthalic acid monoamide and (2) from 1.75 to 4.75 per cent by weight based on the weight of (1) of an aldehyde reactable mono-hydroxy aryl sulfonic acid containing a phenolic hydroxy radical.

4. An article of manufacture comprising a plurality of wood surfaces bonded together by means of an adhesive comprising (1) a resinous reaction product of (a) a liquid, alkaline-catalyzed condensation product of a phenol and formaldehyde and (b) phthalic acid monoamide, said resinous product having a pH of from 4.5 to 5.5, and (2) from 1.75 to 4.75 per cent by weight based on the weight of (1) of phenol sulfonic acid.

5. An article of manufacture comprising a plurality of highly compressed, impregnated veneer structures bonded together by means of an adhesive comprising (1) a resinous reaction product of a liquid, product of a phenol and formaldehyde and a derivative alkaline-catalyzed condensation of a polycarboxylic acid containing at least three carbon atoms, said derivative containing at least one —COOH radical and at least one amidated carboxylic radical having at least one hydrogen atom attached directly to an amide nitrogen, said resinous product having a pH of from 4.5 to 5.5, and (2) an aldehyde reactable mono-hydroxy aryl sulfonic acid in an amount corresponding to from 1.75 to 4.75 per cent by weight based on the weight of (1), said mono-hydroxy aryl sulfonic acid containing a phenolic hydroxy group.

6. An adhesive for gluing wood comprising an (1) a resinous reaction product of a liquid, alkaline-catalyzed phenol-aldehyde resin and a derivative of a polycarboxylic acid containing at least three carbon atoms, said derivative containing at least one —COOH radical and at least one amidated carboxylic radical having at least one hydrogen atom attached directly to an amide nitrogen, and, (2) as a hardening accelerator therefor, from about 1.75 to 4.75 per cent by weight, based on the weight of (1), of an aldehyde-reactable mono-hydroxyl aryl sulfonic acid containing a phenolic hydroxy radical.

7. An adhesive as in claim 6 wherein the derivative of a polycarboxylic acid is phthalic acid monoamide.

8. An adhesive as in claim 6 wherein the derivative of a polycarboxylic acid is maleic acid monoamide.

9. An adhesive as in claim 6 wherein the derivative of a polycarboxylic acid is succinic acid monoamide.

10. An adhesive for gluing wood comprising (1) a spreadable, partially dehydrated, resinous reaction product of a liquid, alkaline-catalyzed phenol-formaldehyde resin and a sufficient amount of a semi-amide of a polycarboxylic acid containing at least three carbon atoms, said derivative containing at least one —COOH radical and at least one amidated carboxylic radical having at least one hydrogen atom attached directly to an amide nitrogen to obtain a pH of about 4.5 to 5.5 in the resin reaction product, and (2) from 2 to 3.6 per cent by weight of phenol sulfonic acid based on the weight of the partially dehydrated, resinous reaction product.

11. An adhesive for gluing wood comprising (1) a spreadable, partially dehydrated, resinous reaction product of a liquid, alkaline-catalyzed phenol-formaldehyde resin and a sufficient amount of a derivative of a polycarboxylic acid containing at least three carbon atoms, said derivative containing at least one —COOH radical and at least one amidated carboxylic radical having at least one hydrogen atom attached directly to an amide nitrogen to obtain a pH of about 4.5 to 5.5 in the resinous reaction product, and (2) from 2.1 to 3.8 per cent by weight of cresol sulfonic acid based on the weight of the partially dehydrated, resinous reaction product (1).

12. An adhesive for gluing wood comprising (1) a spreadable, partially dehydrated, resinous reaction product of a liquid, alkaline-catalyzed phenol-formaldehyde resin and a sufficient amount of a derivative of a polycarboxylic acid containing at least three carbon atoms, said derivative containing at least one —COOH radical and at least one amidated carboxylic radical having at least one hydrogen atom attached directly to an amide nitrogen to obtain a pH of about 4.5 to 5.5 in the resinous reaction product, and (2) from 2.6 to 4.7 per cent by weight of naphthol sulfonic acid based on the weight of the partially dehydrated, resinous reaction product (1).

13. An adhesive for gluing wood comprising (1) the resinous reaction product of (a) a liquid, alkaline-catalyzed, heat-reaction product of a phenol and formaldehyde, in the ratio of 1 mol of the former to at least 1.5 mols of the latter, and (b) a sufficient amount of a derivative of a polycarboxylic acid containing at least three carbon atoms, said derivative containing at least one —COOH radical and at least one amidated carboxylic radical having at least one hydrogen atom attached directly to an amide nitrogen to obtain a pH of 4.5 to 5.5 in the resinous reaction product, the said resinous product being dehydrated to a viscosity at 25° C. of about 12,000 to 100,000 cp., and (2) from 1.75 to 4.75 per cent by weight, based on the weight of (1), of an aldehyde-reactable mono-hydroxy aryl sulfonic acid containing a phenolic hydroxy group.

14. An adhesive for gluing wood comprising (1) a spreadable, resinous reaction product of (a) a liquid, alkaline-catalyzed, condensation product of phenol and formaldehyde and (b) a derivative of a polycarboxylic acid containing at least three carbon atoms, said derivative containing at least one —COOH radical and at least one amidated carboxylic radical having at least one hydrogen atom attached directly to an amide nitrogen, and (2) a hardening agent for (1) corresponding to from 7 to 12 per cent by weight of a 30 per cent aqueous solution of phenol sulfonic acid based on the weight of (1).

15. An adhesive for gluing wood comprising a liquid phenol-formaldehyde resin having a viscosity at 25° C. of approximately 12,000 to 26,000 cp. and as a hardening agent therefor, an aqueous solution of from 1.75 to 4.75 per cent by weight of an aldehyde-reactable mono-hydroxy aryl sulfonic acid containing a phenolic hydroxy group based on the weight of the liquid resin, said liquid resin being a dehydrated reaction product of (1) a partial alkaline-catalyzed condensation product of phenol and formaldehyde, in the ratio of 1 mol of the former to from 1.5 to 2.5 mols of the latter, and (2) monophthalamide.

16. A cold-set adhesive for gluing wood comprising (1) a resinous reaction product of a liquid alkaline-catalyzed phenol-formaldehyde condensation product and phthalic acid monoamide and (2) from 2.7 to 3.6 per cent by weight of phenol sulfonic acid based on the weight of (1).

17. A cold-set adhesive for gluing wood comprising (1) a resinous reaction product of (a) an alkaline-catalyzed, liquid, heat-reaction product of phenol and formaldehyde, in the ratio of 1 mol of the former to 1.5 mols of the latter, and (b) sufficient mono-phthalamide to obtain a pH of 4.5 to 5.5, the said resinous product being dehydrated to a viscosity at 25° C. of about 12,000 to 26,000 cp., and (2) from 7 to 12 per cent by weight, based on the weight of (1) of a 30 per cent aqueous solution of phenol sulfonic acid.

GAETANO F. D'ALELIO.

CERTIFICATE OF CORRECTION.

Patent No. 2,389,418. November 20, 1945.

GAETANO F. D'ALELIO.

It is hereby certified that error appears in the printed specification of the above numbered patent requiring correction as follows: Page 1, second column, line 40, for "it is" read --is it--; page 3, second column, lines 71 and 72, claim 5, strike out the words "alkaline-catalyzed condensation" and insert the same before "product", line 70, same claim; page 4, first column, line 20, claim 6, for "hydroxyl" read --hydroxy--; and that the said Letters Patent should be read with this correction therein that the same may conform to the record of the case in the Patent Office.

Signed and sealed this 5th day of March, A. D. 1946.

(Seal)

Leslie Frazer

First Assistant Commissioner of Patents.